March 18, 1958     G. K. GUTTWEIN     2,827,622
RECORDING VIBRATION METER USING ANGULAR MODULATION
Filed May 28, 1952
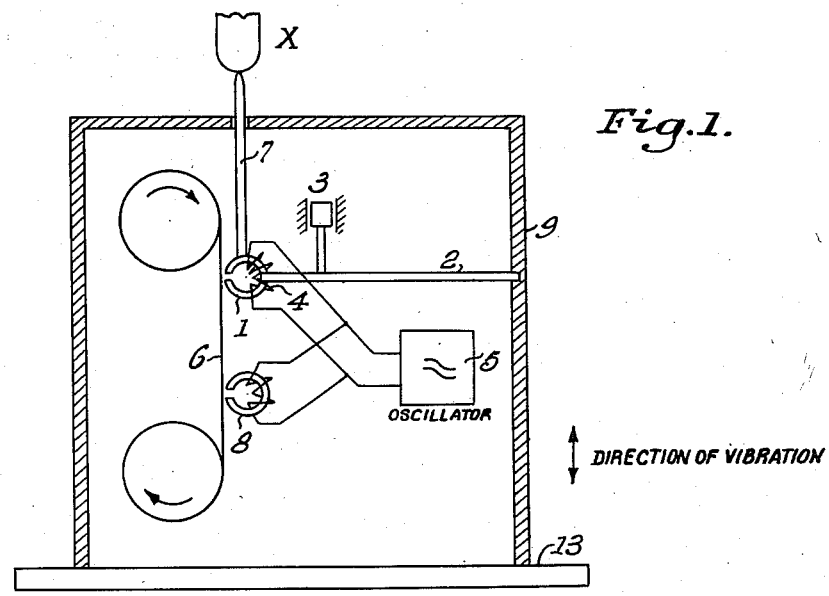
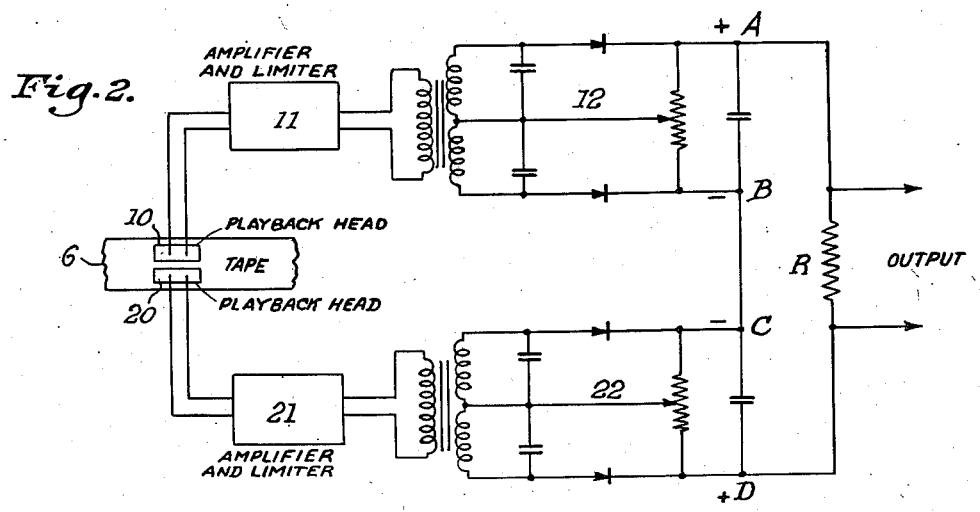
INVENTOR.
GUNTER K. GUTTWEIN
BY
Harry M. Saragovitz
ATTORNEY

United States Patent Office 2,827,622
Patented Mar. 18, 1958

2,827,622

RECORDING VIBRATION METER USING ANGULAR MODULATION

Gunther K. Guttwein, Long Branch, N. J.

Application May 28, 1952, Serial No. 290,612

4 Claims. (Cl. 340—174)

(Granted under Title 35, U. S. Code (1952), sec. 266)

This invention may be manufactured and used by or for the Government for governmental purposes without the payment to me of any royalty thereon.

This invention relates to an instrument for measuring and recording the vibrations of a mechanical system.

An object of this invention is to provide a vibration measuring and recording instrument which may be utilized in the design of an accelerometer, a velocity meter, a displacement meter or the like.

Another object of this invention is to provide an instrument whereby the vibrations of a mechanical system are recorded on magnetic tape as an angular modulation of a carrier frequency, and in which the recording head of such an instrument is part of the mechanical system.

A further object of this invention is to provide an instrument which renders an angular modulation of a carrier frequency, which may be either frequency modulation or phase modulation, during recording on a magnetic tape to provide a very accurate method of measuring and recording acceleration, velocity or displacement.

In a co-pending application by Guttwein and Priebe entitled "Magnetic Recording Accelerometer," Serial No. 229,242, filed May 31, 1951, a simple method for measuring and recording accelerations which utilizes magnetic tape recording has been disclosed. The accuracy of such a method is limited, however, because the playback voltage of a simple magnetic recording system exhibits small amplitude fluctuations which are caused by irregularities of the recording systems. Where a high accuracy is necessary, a carrier frequency is generally recorded on the magnetic tape which carries the information in the form of a frequency modulated signal. The signal output in such a system depends only upon the modulation frequency and not upon the carrier amplitude. The effect of all irregularities of the recording medium are eliminated in this manner.

The general theory of operation of seismic accelerometers is well known to those skilled in the art, being outlined in "Mechanical Vibrations," page 75, by Den Hartog, 3rd ed., 1947, published by McGraw-Hill. A spring-mounted mass moves relative to the supporting framework which is subject to vibration of acceleration. The reaction of the spring-mounted mass against the acceleration of the supporting framework will cause deflection of the spring. In a seismic accelerometer the natural frequency of the mass-spring system should be at least twice as high as the highest frequency of the accelerations to which the framework is subjected, in order for the deflection of the spring to represent with substantial accuracy the acceleration to which the system is subjected. Because an impure motion contains harmonics of frequencies higher than the fundamental, one of these frequencies may be very close to the natural frequency of the instrument. In order to avoid this difficulty an accelerometer is provided with suitable damping means, which may employ a fluid or a magnetic damper.

Heretofore, it has been customary to use a recording stylus and a wax paper record in accelerometers. However, since the amplitudes of vibration of the vibrating system are normally very small, in order to obtain a sufficient deviation of the tracing mark on the wax paper for an accurate record, it was necessary to employ a vibrating system having a low natural frequency. This requirement ran counter to the inherent requirement of any accelerometer of the seismic type that the vibrating mass-spring system have a natural frequency which is at least twice as high as the highest frequency of the accelerations to be recorded. In addition, an unknown and varying damping component was introduced in the recording system due to the friction between the stylus and the wax paper record.

These difficulties are overcome in the present invention by forming a magnetic trace on the recording medium. The recording stylus is in the form of a magnet which does not physically contact the recording medium. In response to the accelerations to be recorded the magnet moves in a path which is substantially parallel to the direction of movement of the recording medium while being maintained substantially at the same distance therefrom.

A further advantage of the present invention lies in the fact that optical inspection of the recorded information is not necessary because a magnetic playback device transfers the recorded information into an electrical signal.

In the accompanying drawings, which are given by way of illustration only, Figure 1 shows a schematic view of a recording vibration meter, showing in elevation the relative positions of the spring-mounted magnet, the recording medium, and tape speed error recording means, while Figure 2 shows, in partial block diagram and partial schematic, one type of playback device incorporating tape speed error correction means.

Referring to Figure 1, a housing 9 and base plate 13 serve to enclose the instrument, which may be either attached to a vibrating body to be studied under test, or alternatively may be held in the hands of the operator while recording the vibrations of such body. A magnetic recording head 1 is attached to a vibrating reed 2, which is clamped at the other end into the housing 9. The mass of the recording head and the elasticity of the reed form a mass-spring seismic system, it being readily apparent that reed 2 acts as a cantilever leaf spring. Suitable damping means, which may be of either the fluid or magnetic type, are indicated generally at 3. The coil 4 of the magnetic recording head 1 is energized by the output of the carrier frequency oscillator 5. This oscillator generates a constant frequency potential having sufficient amplitude to saturate one path or channel area located to one side of the longitudinal axis of the magnetic tape 6 which is traveling in a vertical direction. Any conventional tape drive means may be employed, for example a pre-loaded spring clockwork motor, or a fractional horsepower synchronous motor may be used to move the tape at a substantially constant speed. The particular drive means employed forms no part of this invention.

In operation, when the instrument is attached to a vibrating body under test, the shocks and vibrations occurring in vertical directions will cause a vibration of the magnetic recording head 1 which is the seismic mass of the system. As pointed out above, the magnet does not physically contact the recording medium, but moves in a path substantially parallel to the direction of movement of the recording tape; hence the relative velocity between tape and head will change. In this manner an angular modulation of the recorded frequency will result which is proportional to the applied mechanical signal.

If the natural frequency of the seismic system (consisting of mass 1 and spring 2) is higher than the signal frequencies to be measured, a constant deflection of the recording head independent of frequency will result for a constant acceleration of the base plate. The electric circuits used in the reproducer can be designed in such a manner that the instrument will serve either as an accelerometer or as a velocity meter. If the natural frequency of the seismic system is made lower than the signal frequencies, the velocity of the recording head will be proportional to the velocity of the base plate. Such a design is suitable for a velocity meter.

In order to measure the displacement of a vibrating body X, as indicated in Figure 1, an instrument may be used which employs a mechanical link between the vibrating body and the seismic mass of the recording head. In Figure 1 this link consists of the rod 7 which transmits the displacement of the structure or body X to the recording head 1. In practice, these hand-held instruments may be constructed somewhat differently than those instruments which are to be attached to the vibrating body under test. To simplify the accompanying drawings, however, Figure 1 is used to illustrate the principle of the hand-held instrument. Similar instruments for measuring the displacement of a separate vibrating body X, operating on a purely mechanical basis wherein a pointed stylus traces a record on wax paper, have been found very satisfactory as long as the vibration frequencies were low and the vibration amplitudes relatively large. The principle of angular modulation embodied in my invention is very sensitive and capable of indicating extremely small deflections. The instrument outlined above, therefore, will considerably increase the frequency and amplitude range over that provided by the mechanical displacement indicators of the prior art.

A second recording head 8, identical to head 1 and fed by the same oscillator 5, is provided in the instrument. The head 8 is solidly mounted within the instrument housing and records a second channel or path located on the opposite side of the longitudinal axis of tape 6 from that occupied by the portion recorded by head 1. In an angular modulated system, the signal amplitude is converted to deviation of the carrier frequency. Additional changes of frequency, which are introduced in the system, will affect the accuracy of the measurement. A change of the tape speed will correspond to a change of the carrier frequency. It cannot be expected that the tape speed will remain constant under shock conditions. Any fluctuations of the tape speed are recorded on the second channel as a frequency modulation of the carrier. The applied mechanical signal does not affect this channel. In the reproducer, the output of the second channel is used for correction of errors which may arise due to inconstancy of tape speed.

Figure 2 indicates one of the ways in which such an error correction may be accomplished. The output of the playback head of channel 10, which reproduces the mechanical displacement signal, is fed through an amplifier and limiter 11 to a discriminator 12. The second playback head 20, reproducing the tape speed error function, is connected in the same manner through amplifier and limiter 21 to a discriminator 22. The outputs of the two discriminators, 12 and 22, are connected in opposite polarity. If no mechanical signal is applied to the vibration meter, but a fluctuation of the tape speed should occur, a voltage corresponding to that fluctuation will appear between points A and B (Fig. 2). The same voltage, due to the symmetry of the system, but 180° out of phase, will appear between points C and D. These two voltages cancel each other and no voltage will exist between points A and D; e. g., the output of the playback system taken across resistor R does not depend upon fluctuations of the tape speed.

The method outlined above is not the only one which can be employed in the reproducer. The technical requirements for the vibration meter will vary with respect to the type of motion to be measured, sensitivity, tape speed, amplitude and frequency range. Such requirements will determine the details of the angular modulation system, which in turn, will govern the design of the reproducer. It might be advantageous in some cases to use a frequency conversion to a higher carrier frequency prior to demodulation or to convert the output of the playback heads to a train of pulses.

What I claim is:

1. A recording mass-spring vibration instrument comprising in combination, a housing, a cantilever leaf spring attached at one end to said housing and having a free end movable along a single axis, a damping means connected to said leaf spring near its free end, a magnetic recording head carried by the free end of said cantilever leaf spring whereby said head will act as a seismic mass, means for energizing said recording head with a potential of predetermined frequency, a magnetizable recording medium, and means for passing said medium past said recording head mass in close adjacency thereto in a direction substantially parallel to the axis along which said recording head mass is permitted to move.

2. A recording mass-spring vibration instrument comprising, in combination, a housing, a first magnetic recording head, means whereby said head will act as a seismic mass, said means including means connected to said housing and to said first magnetic recording head for resiliently supporting said head to permit displacement of said head along one axis only with respect to said housing in response to acceleration of said housing, a second magnetic recording head rigidly connected to said housing, means for energizing said recording heads with a potential of predetermined frequency, a magnetizable recording medium and means for passing said medium past both said recording heads in close adjacency thereto in a direction substantially parallel to the axis along which said first recording head may move upon displacement, said second recording head being offset from said first recording head in a direction at right angles to the direction of motion of said recording medium whereby two independent tracks are recorded upon said recording medium.

3. A recording mass-spring vibration instrument comprising, in combination, a housing, a first magnetic recording head, means whereby said head will act as a seismic mass, said means including means connected to said housing and to said first magnetic recording head for resiliently supporting said head to permit displacement of said head along one axis only with respect to said housing in response to acceleration of said housing, a second magnetic recording head adjacent thereto and rigidly connected to said housing, means for energizing said recording heads with a potential of predetermined frequency, a magnetizable recording medium, and means for passing said medium past both said recording heads at a substantially uniform velocity in a direction substantially parallel to the axis along which said first recording head is free to move to produce on said medium adjacent magnetized records.

4. A recording mass-spring vibration instrument comprising, in combination, a housing, a first magnetic recording head, means whereby said head will act as a seismic mass, said means including means connected to said housing and to said first magnetic recording head for resiliently supporting said head to permit displacement of said head along one axis only with respect to said housing in response to acceleration of said housing, a second magnetic recording head rigidly connected to said housing, means for energizing both said recording heads with a potential of predetermined frequency, a magnetizable record medium, means for passing said medium past both said recording heads at a substantially uniform velocity in a direction substantially parallel to the axis along which said first recording head is free to move to produce on said medium a first angularly modulated composite record of any movement of said first magnetic recording head plus any fluctuations in the velocity of said recording medium and a second angularly modulated record of only the fluctuations in velocity of said recording medium whereby said recording medium will carry, in fixed time relationship to the record of movements of said first magnetic recording head, a separate record of any undesired fluctuations in the velocity of said recording medium which took place during the recording process.

References Cited in the file of this patent

UNITED STATES PATENTS

| | | |
|---|---|---|
| 2,272,984 | Ritzmann | Feb. 10, 1942 |
| 2,352,219 | Olesen | June 27, 1944 |
| 2,560,234 | Masterson | July 10, 1951 |
| 2,561,338 | Camras | July 24, 1951 |
| 2,583,983 | Arndt et al. | Jan. 29, 1952 |
| 2,585,913 | Camras | Feb. 19, 1952 |
| 2,590,627 | Lenehan | Mar. 25, 1952 |
| 2,612,565 | Heller | Sept. 30, 1952 |
| 2,654,809 | Camras | Oct. 6, 1953 |
| 2,658,950 | Canfora | Nov. 10, 1953 |
| 2,668,283 | Mullin | Feb. 2, 1954 |
| 2,685,079 | Hoeppner | July 27, 1954 |
| 2,698,930 | Gutterman | Jan. 4, 1955 |
| 2,713,676 | Fleming | July 19, 1955 |
| 2,714,202 | Downing | July 26, 1955 |

FOREIGN PATENTS

| | | |
|---|---|---|
| 924,800 | France | Mar. 17, 1947 |